M. C. FRENCH.
COLTER.
APPLICATION FILED OCT. 11, 1916.
1,225,949. Patented May 15, 1917.
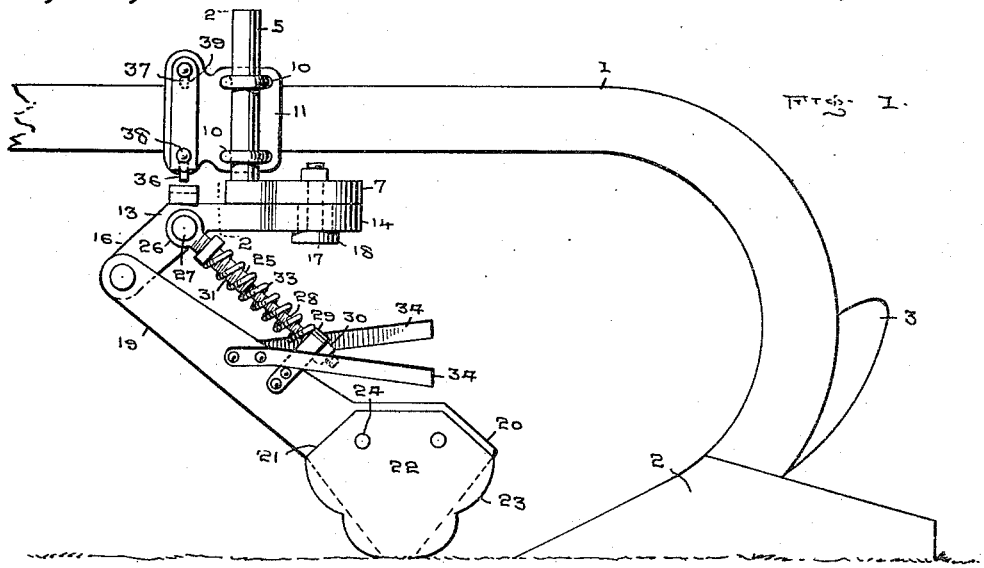
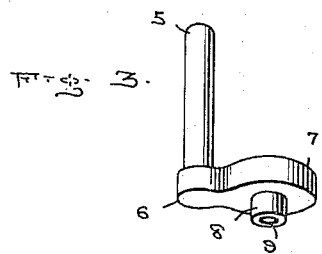
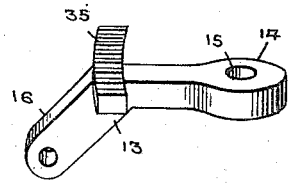
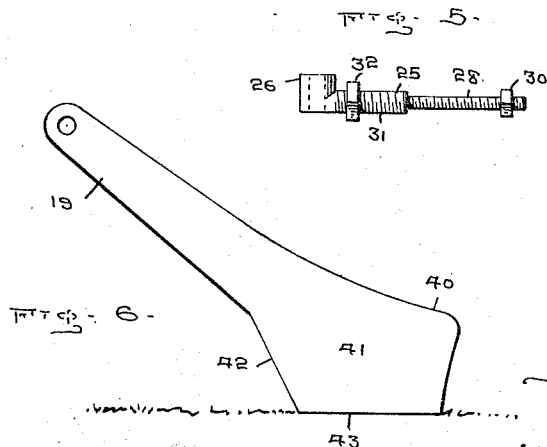
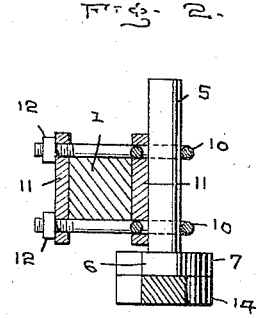
Inventor
M. C. French
By W. T. Fitzgerald
Attorneys

UNITED STATES PATENT OFFICE.

MORGAN C. FRENCH, OF DENVER, COLORADO.

COLTER.

1,225,949.

Specification of Letters Patent.   Patented May 15, 1917.

Application filed October 11, 1916. Serial No. 125,058.

*To all whom it may concern:*

Be it known that I, MORGAN C. FRENCH, a citizen of the United States, residing at 1556 South Washington street, Denver, in the county of Denver and State of Colorado, have invented certain new and useful Improvements in Colters; and I do hereby declare the following to be a full, clear, and exact description of the invention, such as will enable others skilled in the art to which it appertains to make and use the same.

This invention relates to the class of plows and more particularly to an improved colter.

The principal object of the invention is the provision of a colter adapted to be attached to a plow beam and embodying means whereby the colter may be adjusted in fixed angular relation with respect to the plow beam.

Another object of the invention is the provision of a colter arm, means for swivelly connecting the colter arm with the plow beam, and means for holding the swivel means in adjusted position, whereby the colter may be set in any angular relation with respect to the plow beam to assist in holding the plow in its true course.

A further object of the invention is the provision of a colter arm swivelly attached to the plow beam and embodying spring tension means whereby the colter arm may yield upwardly when coming in contact with stones, roots or other obstacles.

A still further object of the invention is to provide means whereby the colter may be adjusted vertically to gage the cutting or penetrating depth of the cutter blade.

With these and other objects in view as will appear as the description proceeds, the invention comprises the various novel features of construction, the combination and arrangement of parts as will be more fully described hereinafter and set forth with particularity in the appended claims.

Referring to the drawings,

Figure 1 is a side elevation of my improved colter shown attached to a plow beam.

Fig. 2 is a vertical transverse sectional view on the line 2—2 of Fig. 1.

Fig. 3 is a detail perspective view of the vertically adjusting member.

Fig. 4 is a detail perspective view of the angular swivel arm.

Fig. 5 is a detail elevation of the tension adjusting rod.

Fig. 6 is a detail elevation of a modified form of combined colter and cutter blade shown as formed from a single piece of material.

Similar characters of reference are used to denote like parts throughout the accompanying drawings and the following description.

Referring more particularly to the drawings, my improved colter is shown as attached to a conventional form of plow beam indicated by the numeral 1, the rear end of which is curved downwardly and provided with the usual share 2 and mold board 3. The colter primarily is attached to the beam 1 through the medium of an adjusting member, as clearly shown in Fig. 3 of the drawings, and this member consists of a shaft 5 and an eccentric plate 6 attached to the lower end thereof, this eccentric plate embodying a head portion 7 that has a boss 8 formed on its bottom surface, and extending through the head portion and the boss is an aperture 9.

The shaft 5 of the adjusting member is attached to the plow beam through the medium of a pair of clip bolts 10 which embrace the shaft 5 and extend transversely through the attaching plates 11 arranged on opposite sides of the beam 1, the terminal end of these clips being provided with clamping nuts 12. By this arrangement the shaft 5 may be adjusted vertically to vary the cutting or penetrating depth of the colter blade, or it may be rotated and then clamped in such rotated position so as to rigidly and firmly hold the colter blade in angular relation with respect to the plow beam.

Attached to the head portion 7 of the eccentric plate 6 is an angular swivel arm 13 having a horizontal portion formed with a head 14 that is provided with an aperture 15, and an angular and downwardly extending arm 16. The boss 8 is designed to be rotatably mounted in the aperture 15 and is securely held therein through the medium of a pivotal bolt 17 that is passed through the aperture 9 and is provided with an enlarged head 18 designed to bear against the underneath surface of the head 14.

Pivotally attached to the lower end of the arm 16 is a downwardly extending colter arm 19, the lower end of this arm being enlarged and of substantially triangular shape as indicated by the numeral 20. This triangular end is cut away on one side as at 21 to provide a recess in which is arranged a substantially triangular cutter blade that is provided with scalloped or stepped cutting edges 23 so as to produce a more effective cutting action. This cutter blade is securely held within the recess through the medium of suitable bolts or rivets 24 that are passed through the blade and the lower end 20 of the colter arm 19.

In order that the colter arm may yield when the cutter blade comes into contact with a root, stone or other obstacle, I provide spring tension means which is shown to consist of a tension adjusting rod 25 that is provided with an enlarged offset end 26 pivotally connected as at 27 to the angular arm 16 of the swivel arm. The opposite end of this rod 25 is reduced to provide a threaded shank 28 that is designed to project through a bracket 29 and to be held in position by a nut 30. The enlarged end 31 of the tension adjusting rod is provided with an adjusting nut 32, and arranged between this nut 32 and the bracket 29 is a tension spring 33.

From this construction it will be apparent that the colter arm 19 may yield upwardly under the tension of this spring 33, and by the adjustment of the nut 32, any desired tension may be placed upon the spring 33 in order to gage and control the yielding movement of the colter arm. Since the upper end of the tension adjusting rod is offset as indicated by the numeral 26 it will be apparent that it will allow of a very great range of vertical movement of the tension rod.

The colter arm 19 is provided with separator arms 34 which extend laterally in angular relation from the colter arm 19, and are designed to spread weeds, brush or the like to one side of the colter proper during its travel over the ground.

Under ordinary conditions the cutter blade 22 will travel ahead and directly in the line of travel of the plow share 2, but when the plow is being used under difficult conditions such as plowing on a hill side or plowing over hard and rocky ground, the colter proper may be adjusted in angular relation with respect to the plow beam and held in such adjusted position so that the colter will act as a rudder and assist in holding the plow in its true course.

The forward end of the swivel arm 13 is provided with a rack bar 35, with which is designed to be engaged the lower end 36 of a latch plate 37, that is vertically adjustable upon one of the attaching plates 11 through the medium of bolts 38 that pass through the latch plate and are slidably mounted in slots 39 formed in the plates 11. When it is desired to position the colter arm in angular relation with the plow beam the swivel arm 13 is swung laterally and the latch plate with its lower end 36 engaged with the rack bar 35, which will securely hold the swivel arm in the desired adjusted position. When the colter arm is arranged in this fixed angular position, it will positively act as a rudder and serve to assist in holding the plow in its true course. Under ordinary conditions the cutter blade 22 will follow along in the true course of the plow without the use of the latch plate.

From the foregoing it will be seen that my improved colter may be adjusted vertically to vary the cutting or penetrating depth thereof, and may have a wide range of horizontal adjustment so as to position the colter in any desired angular relation with respect to the plow beam.

In Fig. 6 will be seen a slightly modified form of the colter arm 19, in which the lower end 40 is formed to provide an integral cutting blade 41 having a downwardly inclined cutting edge 42, and a lower or bottom cutting edge 43. This form of combined colter arm and cutter blade is designed to be used upon rough and rocky ground where plowing is very difficult, this form of colter arm being much more substantial and durable than the one described hereinbefore.

What I claim is:—

1. The combination with a plow beam, of a supporting member adapted to be attached thereto, a horizontal swivel arm attached to said supporting member, a downwardly inclined colter arm pivotally attached at its upper end to said horizontal swivel arm, and a cutter blade carried by the lower end of the colter arm.

2. The combination with a plow beam, of a supporting member adapted to be attached thereto, an angular swivel arm pivotally attached at one end to said supporting member for horizontal movement, a downwardly inclined colter arm pivotally attached at its upper end to the other end of said swivel arm, a cutter blade carried by the lower end of the colter arm, and spring tension means positioned between the angular portion of said swivel arm and the lower end of said colter arm to permit the colter arm to yield upwardly.

3. The combination with a plow beam, of a supporting member, an angular swivel arm pivotally attached at one end to said supporting member for horizontal adjustment, a downwardly inclined colter arm pivotally attached at its upper end to the other end of the swivel arm, a bracket carried by the lower end of the colter arm, a tension adjusting rod pivotally attached at its upper end to the angular portion of said swivel arm and having its lower end slidably projecting through said bracket and provided with a retaining nut, an adjusting nut mounted on and adjacent the upper end of the tension rod, and a spring positioned on the tension rod between said bracket and the said adjusting nut, whereby the tension upon the colter arm may be varied.

4. The combination with a plow beam, of a vertically adjustable shaft adapted to be attached to and supported by the plow beam, a horizontally disposed eccentric plate carried by the lower end of said shaft and adapted to be adjusted in a horizontal plane, a swivel arm pivotally attached at one end to said eccentric plate for horizontal swinging movement, and a colter arm pivotally attached at its upper end to the other end of the swivel arm.

5. The combination with a plow beam, of a vertically adjustable and rotatable shaft, means for clamping said shaft in adjusted position to the plow beam, a horizontally arranged eccentric plate carried by the lower end of said shaft, a horizontal swivel arm pivotally attached at one end to said eccentric plate, and a colter arm pivotally attached at its upper end to the other end of said swivel arm.

6. The combination with a plow beam, of a supporting member, means for attaching said supporting member to the plow beam, an angular swivel arm pivotally attached at one end to the supporting member for horizontal swinging movement, a downwardly inclined colter arm pivotally attached at its upper end to the angular end of said swivel arm, a horizontal rack bar mounted on said swivel arm intermediate its ends, and a vertically adjustable latch carried by said attaching means and adapted to engage said rack to hold the horizontal swivel arm and the downwardly inclined colter arm in any desired adjusted angular relation with respect to the plow beam.

In testimony whereof I have signed my name to this specification in the presence of two subscribing witnesses.

MORGAN C. FRENCH.

Witnesses:
CLYDE W. TURNBULL,
BESSIE M. JONES.

Copies of this patent may be obtained for five cents each, by addressing the "Commissioner of Patents. Washington, D. C."